(12) United States Patent
Schmid

(10) Patent No.: US 10,481,277 B2
(45) Date of Patent: Nov. 19, 2019

(54) POSITION CORRECTION OF A VEHICLE BY REFERENCING TO OBJECTS IN THE SURROUNDINGS

(71) Applicant: CONTINENTAL AUTOMOTIVE GMBH, Hannover (DE)

(72) Inventor: Bernhard Schmid, Freidberg (DE)

(73) Assignee: CONTINENTAL AUTOMOTIVE GMBH, Hannover (DE)

( * ) Notice: Subject to any disclaimer, the term of this patent is extended or adjusted under 35 U.S.C. 154(b) by 470 days.

(21) Appl. No.: 15/303,137

(22) PCT Filed: Apr. 9, 2015

(86) PCT No.: PCT/EP2015/057731
§ 371 (c)(1),
(2) Date: Oct. 10, 2016

(87) PCT Pub. No.: WO2015/155292
PCT Pub. Date: Oct. 15, 2015

(65) Prior Publication Data
US 2017/0038477 A1    Feb. 9, 2017

(30) Foreign Application Priority Data

Apr. 9, 2014   (DE) ........................ 10 2014 206 888

(51) Int. Cl.
*G01S 19/51*       (2010.01)
*G01S 19/48*       (2010.01)
*G01C 21/30*       (2006.01)

(52) U.S. Cl.
CPC .............. *G01S 19/51* (2013.01); *G01C 21/30* (2013.01); *G01S 19/48* (2013.01)

(58) Field of Classification Search
CPC .......... G01S 19/51; G01S 19/48; G01C 21/30
See application file for complete search history.

(56) References Cited

U.S. PATENT DOCUMENTS

2008/0319657 A1   12/2008  Gao
2011/0161032 A1    6/2011  Stahlin
(Continued)

FOREIGN PATENT DOCUMENTS

DE    102008053531 A1   5/2009
DE    102010033729 A1   2/2012
(Continued)

OTHER PUBLICATIONS

International Search Report and Written Opinion dated Jul. 16, 2015 from corresponding International Patent Application No. PCT/EP2015/057731.

(Continued)

*Primary Examiner* — Anne M Antonucci

(57) ABSTRACT

The invention relates to a method for correcting a position of a vehicle using a global satellite navigation system (GNSS) for determining the own position, comprising the following steps: establishing a first position of the with the GNSS, establishing a second position of the vehicle by fitting the first position into a street of a digital map, identifying at least one object in the surroundings of the vehicle, the position of which is referenceable in the digital map, establishing a real distance between the vehicle and the respective object by means of a sensor of the vehicle, calculating a calculated distance between the second position and the respective object, wherein a corrected position of the vehicle is established by minimizing the deviation of the calculated distance from the real distance.

16 Claims, 8 Drawing Sheets

(56) References Cited

U.S. PATENT DOCUMENTS

2012/0310516 A1    12/2012  Zeng
2013/0151146 A1     6/2013  Syed et al.
2015/0081211 A1*    3/2015  Zeng ................. B60W 30/0956
                                                              701/446

FOREIGN PATENT DOCUMENTS

DE    102012014397  A1    1/2014
EP         0921509  A2    6/1999
EP         1895318  A1    3/2008
JP       20060018086 A    1/2006

OTHER PUBLICATIONS

German Search Report dated Mar. 9, 2016 for corresponding German Patent Application No. 10 2015 206 342.9.
China Office Action dated Jun. 26, 2018 for corresponding Chinese Patent Application No. 201580017945.7.

* cited by examiner

POSITION CORRECTION OF A VEHICLE BY REFERENCING TO OBJECTS IN THE SURROUNDINGS

TECHNICAL FIELD

The invention concerns a method and a system for correcting a position of a vehicle.

BACKGROUND

In the prior art it is known to locate vehicles or to determine the position of the vehicle by means of global satellite navigation systems (abbreviated below to GNSS for "Global Navigation Satellite System"), such as for example GPS, and to merge the vehicle position with a digital map. For this purpose, the position of the vehicle is brought into alignment with a plausible position in the digital map.

However, a maximum location accuracy of 1 m is achieved by the GNSS location. Said accuracy is not adequate for lane-accurate location on a road. On top of that, the accuracy of the known method depends significantly on the quality of the map data.

It is therefore the object of the invention to reveal a method or a system with which a vehicle position can be determined more precisely.

SUMMARY

According to one embodiment, a method for correcting a position of a vehicle with a global satellite navigation system GNSS for determining the actual position is proposed that comprises the steps: determining a first position of the vehicle by means of the GNSS, determining a second position of the vehicle by fitting the first position into a road of a digital map, identifying at least one object in the surroundings of the vehicle, the position of which can be referenced in the digital map, determining a real distance between the vehicle and the respective object by means of a sensor of the vehicle, calculation of a calculated distance between the second position and the respective object, and wherein a corrected position of the vehicle is determined by minimizing the deviation of the calculated distance from the real distance.

On the one hand is the basic idea of using at least one, preferably two or three, objects in the surroundings as additional reference points for the position detection of the vehicle in addition to the provided map data. A further significant idea comprises comparing two data images with each other. According to one embodiment, it is proposed to compare a first real position image of the vehicle with a virtual position image of the vehicle. The term position image means the information relating to different positions, inter alia the position of the vehicle and the position of the object or the objects. The real position image is composed from measurements using means that are present in the vehicle. Said means are for example the GNNS and other sensors installed in the vehicle or even data receivers. The virtual position image is composed from received or calculated digital data. A significant component of the position images are the distances between the vehicle position and the objects. The use of distances has the advantage that one of the position images can be defined vectorially, whereby handling the data is significantly simplified.

It is advantageous for the method to use objects that are positioned in the close surroundings of the vehicle, so that the assumption can be made that the region under consideration is a plane.

A digital map means in particular a road map containing the positions and possibly also dimensions of roads. Further, the digital map also comprises positions and possibly also dimensions of objects within the map reference system. Objects can be road equipment, buildings, stopping points, prominent road irregularities or similar.

According to one advantageous embodiment of the method, the digital map is iteratively shifted such that the deviation of the calculated distance from the real distance is minimized. This is based on the assumption that the digital map does not necessarily contain the precise data and a unilateral correction of the vehicle position according to the digital map is not advisable. Alternatively, it is however also conceivable to shift the determined first position iteratively so that the deviation between the previously defined distances is smaller.

According to one advantageous embodiment of the method, the displacement of the digital map comprises at least one translational and one rotational displacement. In this way a particularly precise and rapid adjustment of the map is possible to achieve the absolute minimum deviation.

According to one advantageous embodiment of the method according, the minimization of the deviation is determined according to the method of least squares or the least-square method. Said method has proven to be particularly practicable. The method can be used regardless of whether the map or a position is shifted.

According to one advantageous embodiment of the method, a plurality of objects, in particular two to three, is detected. In particular, with two to three objects the position of the vehicle can be corrected with sufficiently high precision with little effort.

According to one advantageous embodiment, the method further comprises the step: Performing a second correction of the corrected position by fitting the corrected position into a plausible lane of the road. A more precise correction of the vehicle position can be ensured by said latter final step, because the first fit into the map does not necessarily have to be carried out accurately to a lane and furthermore a first orientation to the lane can be lost again by shifting the map.

According to one advantageous embodiment, the method further comprises the step: determining the shortest distance from the first position to a point on the road, in particular a plausible lane of the road, in the digital map, and fitting the first position in at said point to determine the second position. Particularly rapid fitting of the first position into the digital map is possible in this way. Fitting into the lane according to the last step in the aforementioned embodiment can also be carried out in a corresponding way.

According to one advantageous embodiment of the method, determining the real distance is carried out by means of an environment sensor system, a camera sensor system and/or a radar sensor system and/or a lidar sensor system and/or an ultrasonic sensor system and/or a temperature sensor system and/or a rain sensor system and/or a road condition sensor system and/or a chassis sensor system. A chassis sensor system means for example wheel revolution rate sensors, acceleration sensors, yaw rate sensors or similar.

According to one advantageous embodiment of the method, determining the first position is further carried out by means of the plurality of vehicle sensors. In this way, very high precision of the first position is achieved. Moreover, in this way the lack of or poor quality of the satellite signals can be compensated for.

According to one advantageous embodiment of the method, determining the first position is further carried out by means of a sensor fusion unit for merging and plausibility checking the sensor data. A sensor fusion unit can for example mean a unit of the applicant that is internally designated and is also marketed inter alia under the name "M2XPro". Particularly high precision of the first position is achieved in this way.

According to one advantageous embodiment of the method, the position of the object is transmitted by means of a vehicle-2-X message. In this way an alternative or additional data source can be utilized for indicating the position of objects.

According to one advantageous embodiment, the method comprises a correction of the position of the respective object and transmission of the corrected position of the respective object to a map server. In this way, successive improvement of the map material and thereby an associated smaller deviation between the real and virtual position images can be achieved.

According to one advantageous embodiment of the method, the digital map is obtained from a map server.

According to one advantageous embodiment, the method further comprises the step: checking a time stamp of the digital map and selecting the digital map if said digital map is the most up to date. In this way it is ensured that the most up to date version of the digital map is always used in order to avoid unnecessary deviations between the real and virtual position images as a priority.

Further according to a second aspect a system for correcting a position of a vehicle with a global satellite navigation system GNSS for determining the actual position, comprising a GNSS for determining a first position of the vehicle, a digital map and a computing unit for determining a second position of the vehicle by fitting the first position into a road in the digital map, means for identifying at least one object in the surroundings of the vehicle, the position of which can be referenced in the digital map, sensors for determining a real distance between the vehicle and the respective object by means of a sensor of the vehicle, wherein the computing unit is further designed for the calculation of a computed distance between the second position and the respective object, and wherein a corrected position of the vehicle can be determined by minimizing the deviation of the computed distance from the real distance.

The system is further designed so that a method according to the aforementioned embodiments can be implemented by means of the system.

BRIEF DESCRIPTION OF THE DRAWINGS

The invention is described in detail below using an exemplary embodiment and using figures. In the figures.

DETAILED DESCRIPTION

Figure 1A:
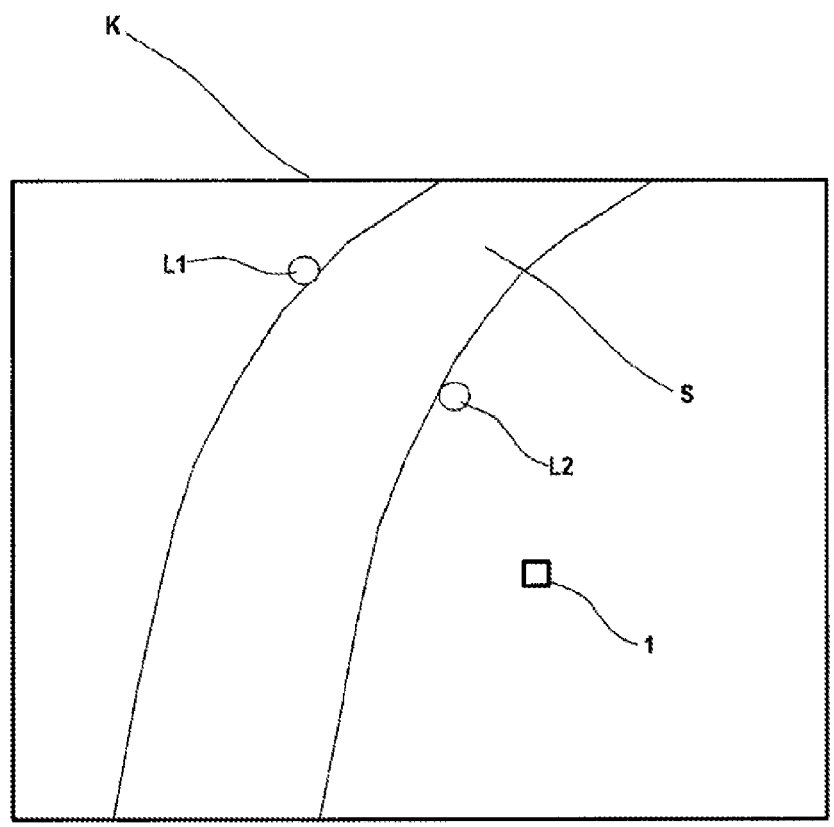
FIG. 1a-1f show a stepwise representation of the method according to the invention using an exemplary embodiment.

FIG. 1a shows the initial situation of a method. Positions that relate to a virtual position image are represented below by circles and positions that relate to a real position image are represented by rectangles.

In the first step a first real position 1 is determined. The vehicle comprises a global satellite navigation system GNSS for this, such as GPS or Glonass, for determining the actual position with which the first position 1 of the vehicle is determined. In addition, the vehicle comprises a digital map K, in which the position, course and width of a road S are stored. Further, the map comprises two objects L1, L2 or landmarks for which the position in the map is stored. There is a deviation between the first measured position 1 and the digital map K, according to which the vehicle would be off the road. Said situation is pre-corrected in the second step.

Figure 1B:
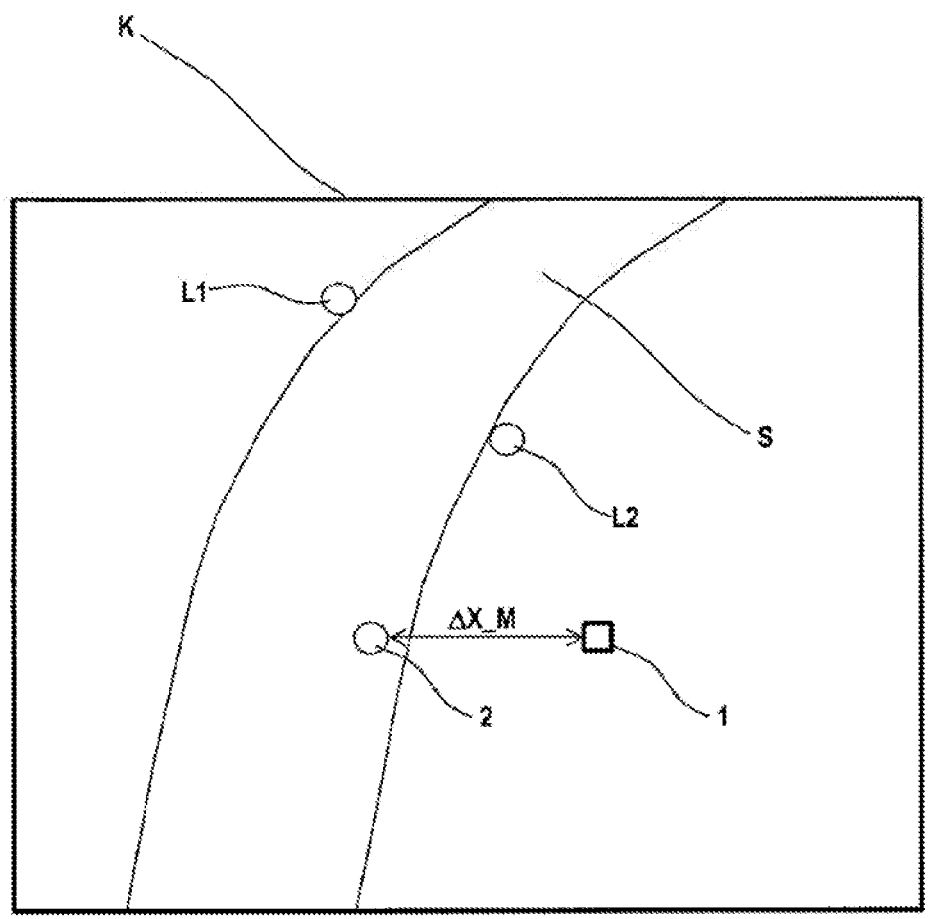

In the second step, as shown in FIG. 1b, a second position 2 of the vehicle is determined by fitting the first position 1 into the road from the digital map K. For this purpose, the shortest distance from the first position to a point on the road or a plausible lane of the road is preferably determined and the first position is fitted in at said point in order to determine the second position. This results in a first position error $\Delta X\_M$.

Figure 1C:
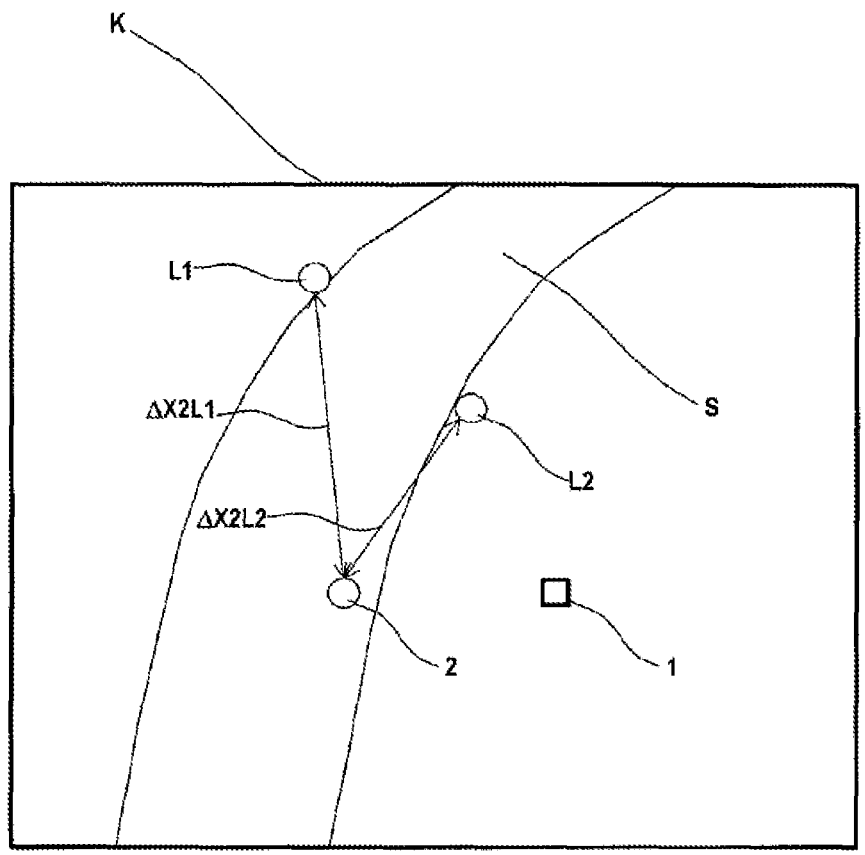
Figure 1D:
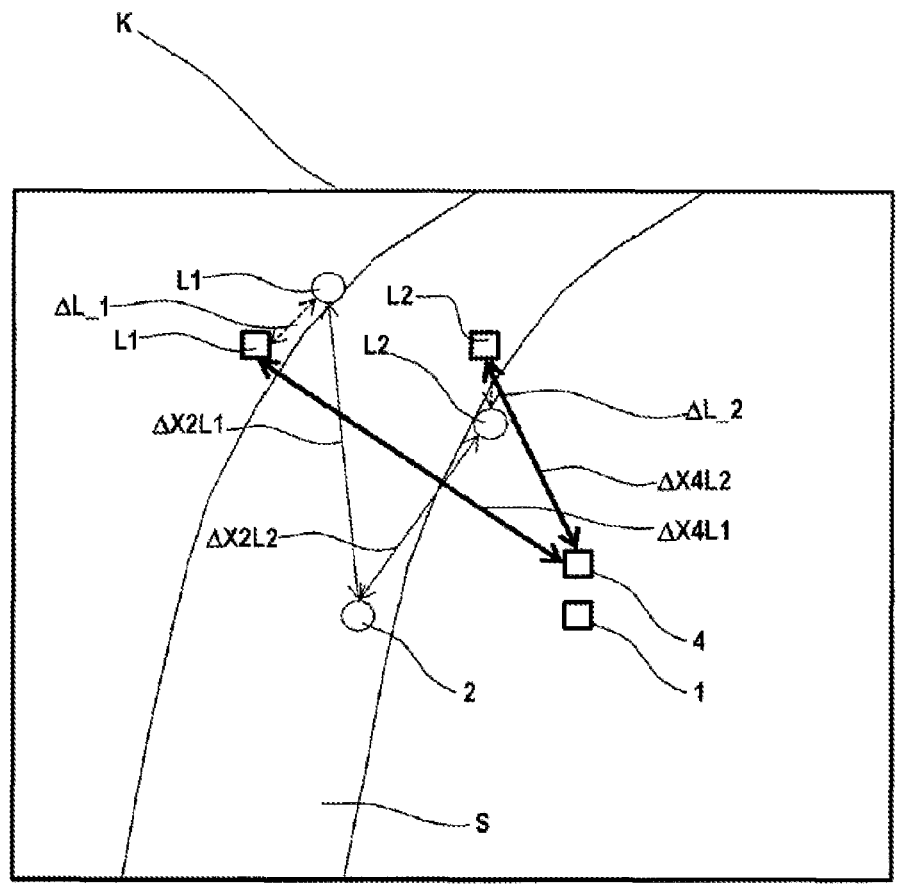

In the third step two processes take place, from which a real and a virtual position image are produced, as can be seen in FIGS. 1c and 1d. The starting point in the third step is identifying at least one of the objects L1, L2, in said example two objects, in the surroundings of the vehicle, the position of which can be referenced in the digital map and can also be detected by means of the vehicle.

In FIG. 1c it is first shown how the virtual position image is produced. After the objects L1, L2 have been identified, the relative distance $\Delta X2L1$ and $\Delta X2L2$ between the second position and the respective object is determined, wherein in the reference characters X2 stands for the second position and L1 and L2 stand for the positions of the first and second objects.

In FIG. 1d it is shown how the real position image is produced. Real relative distances between the vehicle or the position thereof and the respective object or the respective position thereof are determined by means of sensors of the vehicle. For the sake of simplicity, in the figures the positions of the objects in the real position image are also characterized with L1 and L2, even if for this purpose a further indication, such as for example real, could have been used for different identification.

Depending on which object it is, different sensors can be used here, such as for example an environment sensor system, a camera sensor system and/or a radar sensor system and/or a lidar sensor system and/or an ultrasonic sensor system and/or a temperature sensor system and/or a rain sensor system and/or a road condition sensor system and/or a chassis sensor system. If for example the object is partial paving, then acceleration, wheel revolution rate and steering angle sensors can be used in order to determine the distance to the object. Accordingly, a relative real distance from other visually easily detectable objects can be determined by means of a camera sensor system.

The absolute position is not determined, but the relative distance between the vehicle position and the respective object L1, L2 is determined and a position of the objects L1, L2 is projected therefrom, the absolute position of the objects L1, L2 is not needed for the real position image. If said absolute position of the objects is known from a different source than the digital map, however, the same can be used to determine a further pre-correction of the vehicle position using the relative distance $\Delta X4L1$ and $\Delta X4L2$, from which the position 4 as shown in FIG. 1d results. Otherwise, the relative distance corresponds to the distance between the objects L1, L2 and the first position 1 and would be called $\Delta X1L1$ and $\Delta X1L2$.

In FIG. 1d, the deviation $\Delta L\_i$ can further be seen, wherein the i stands collectively for the index 1 or 2 and represents the deviation of the distances from each other between the positions L1 from the real and virtual position images. The deviation is determined from the difference of the distances, i.e. for the object L1 the deviation is given by $$\Delta L\_1 = \Delta X2L1 - \Delta X4L1$$

The deviation would also be determined in a corresponding way for the second object or for all referenced objects.

A corrected position of the vehicle is now determined in the fourth step. For this purpose, the minimum deviation of the computed distance from the real distance is determined. It is particularly preferable for this to use the method of least squares, that is the position change is sought iteratively until $$\text{Min}(\Sigma(\Delta L\_i)^2$$

is reached with i>I.

Figure 1E:
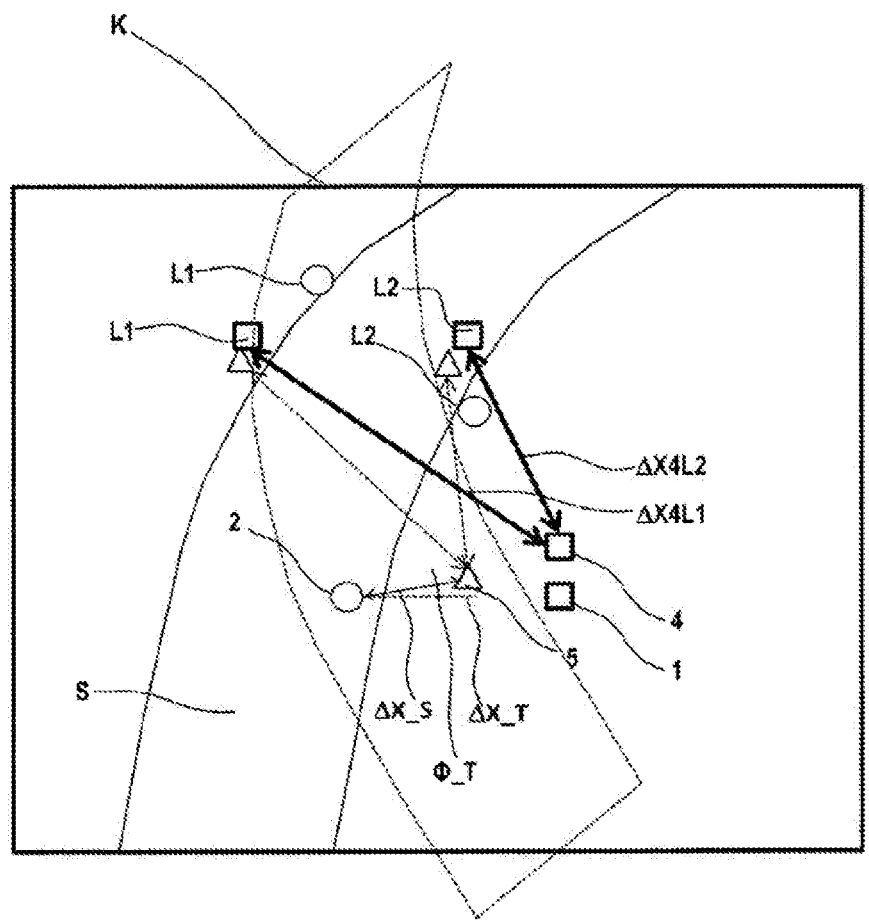
Figure 1F:
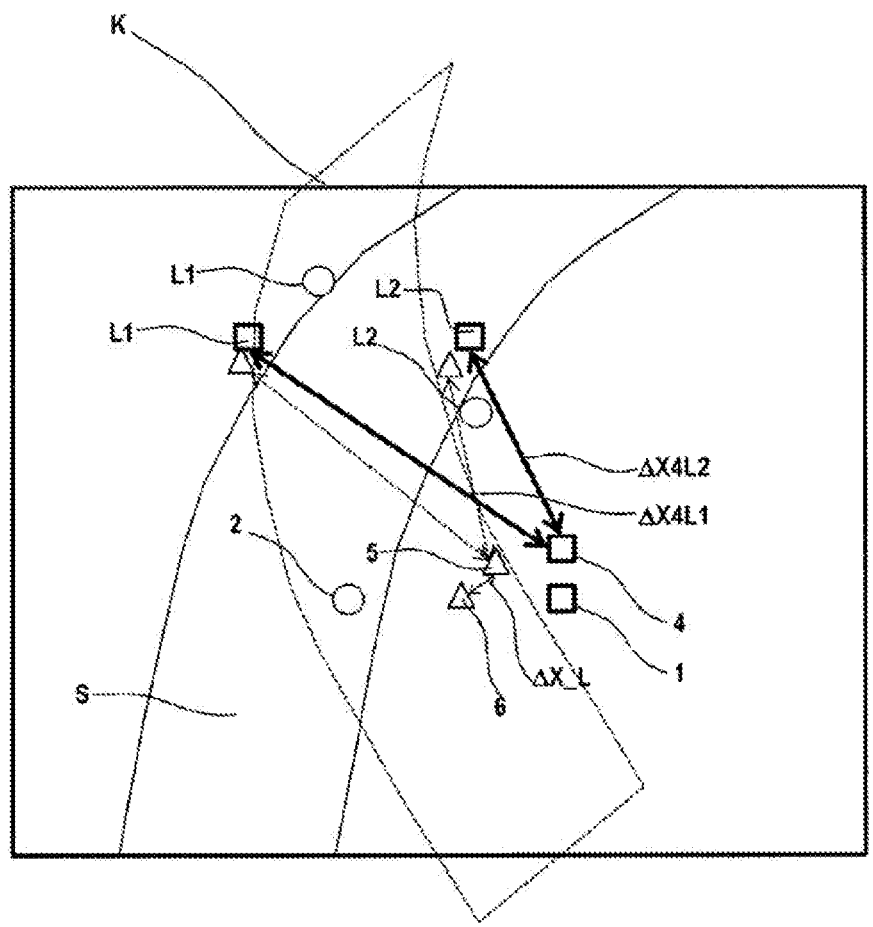

It is particularly preferable for this to shift the digital map iteratively so that the deviation of the computed distance from the real distance is minimized. Said step is shown as an example in FIG. 1e, wherein the shifted map is shown dashed. The digital map including the second position 2 and the position of the objects L1, L2 is iteratively shifted until the absolute minimum deviation is achieved. In doing so, the displacement of the digital map comprises at least one translational and one rotational displacement. In the case of the example, as shown in FIG. 1e, there is a translational displacement by the distance ΔX_T and a rotational displacement φ_T. An improved corrected position 5 results from said displacement, as shown in FIG. 1e. The second position error is characterized in FIG. 1e as ΔX_S and comprises both the translational error and also the rotational error.

Finally, in a fifth step the method can be improved still further by carrying out a second correction, whereby the corrected position is corrected once again by fitting the corrected position into a plausible lane of the road. Advantageously, the last corrected position is shifted to match the digital map for this, so that it is located in the correct lane, i.e. matching the direction of travel. The corrected position of the vehicle is then said last corrected position 6. Alternatively, however, said step can be omitted. The aforementioned position 5 is then the corrected position. The last step can also include a position error ΔX_L consisting of a translational error and a rotational error.

The total error of the position or the correction value of the position therefore consists of the three position errors ΔX_M, ΔX_S and ΔX_L, i.e.

$$\Delta X\_\text{Total} = \Delta X\_M + \Delta X\_S + \Delta X\_L$$

of a map matching error, of a map displacement error and a lane matching error.

The method can be improved and compared to the examples described above by further determining the first position by means of the plurality of vehicle sensors, in particular by means of a sensor fusion unit M2XPro for merging and plausibility checking the sensor data. Such a sensor fusion unit M2XPro is shown in FIG. 3, and together with the GNSS unit can form a system unit.

Figure 2:
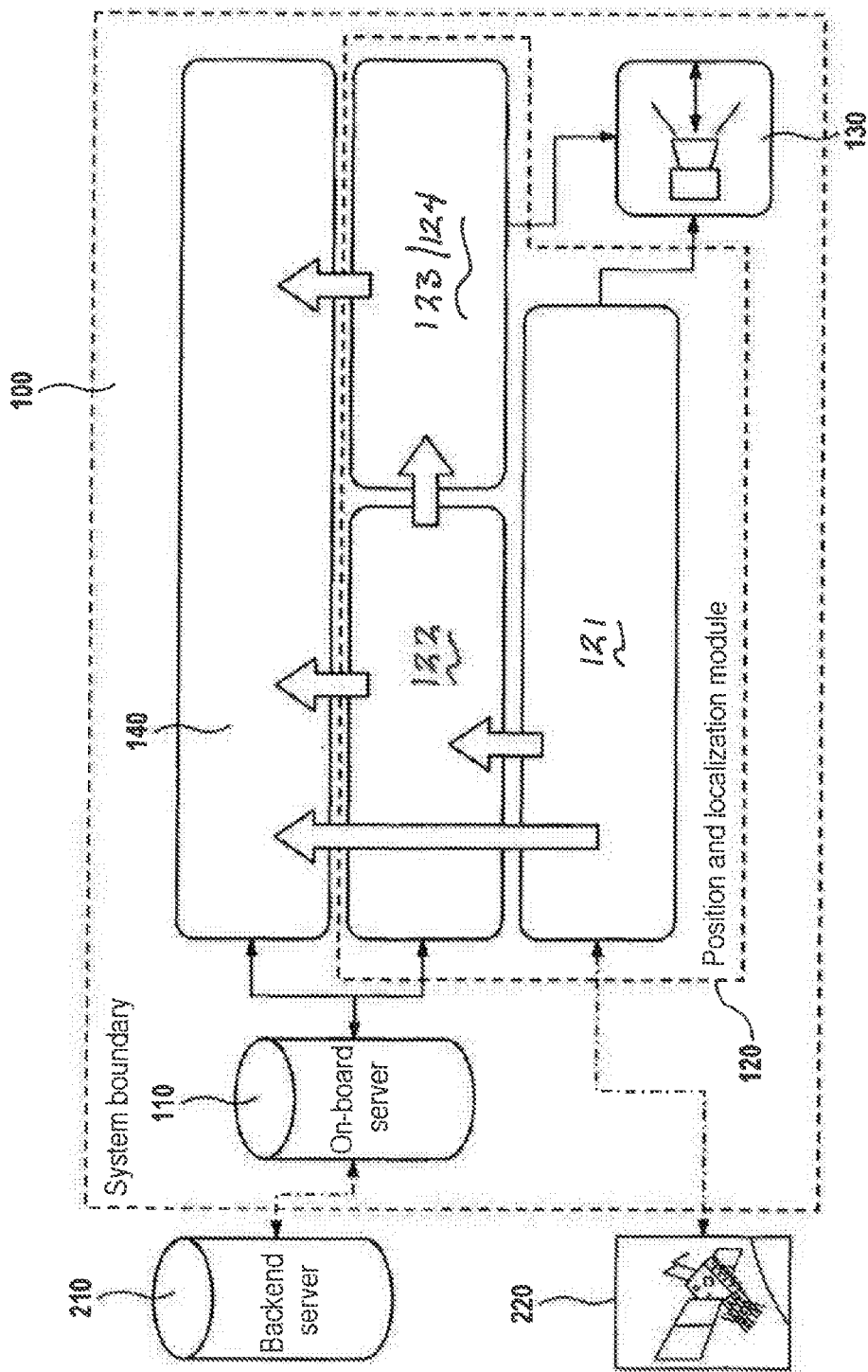
FIG. 2 shows an exemplary first design of a functional architecture of a system according to the invention with possible application cases.
Figure 3:
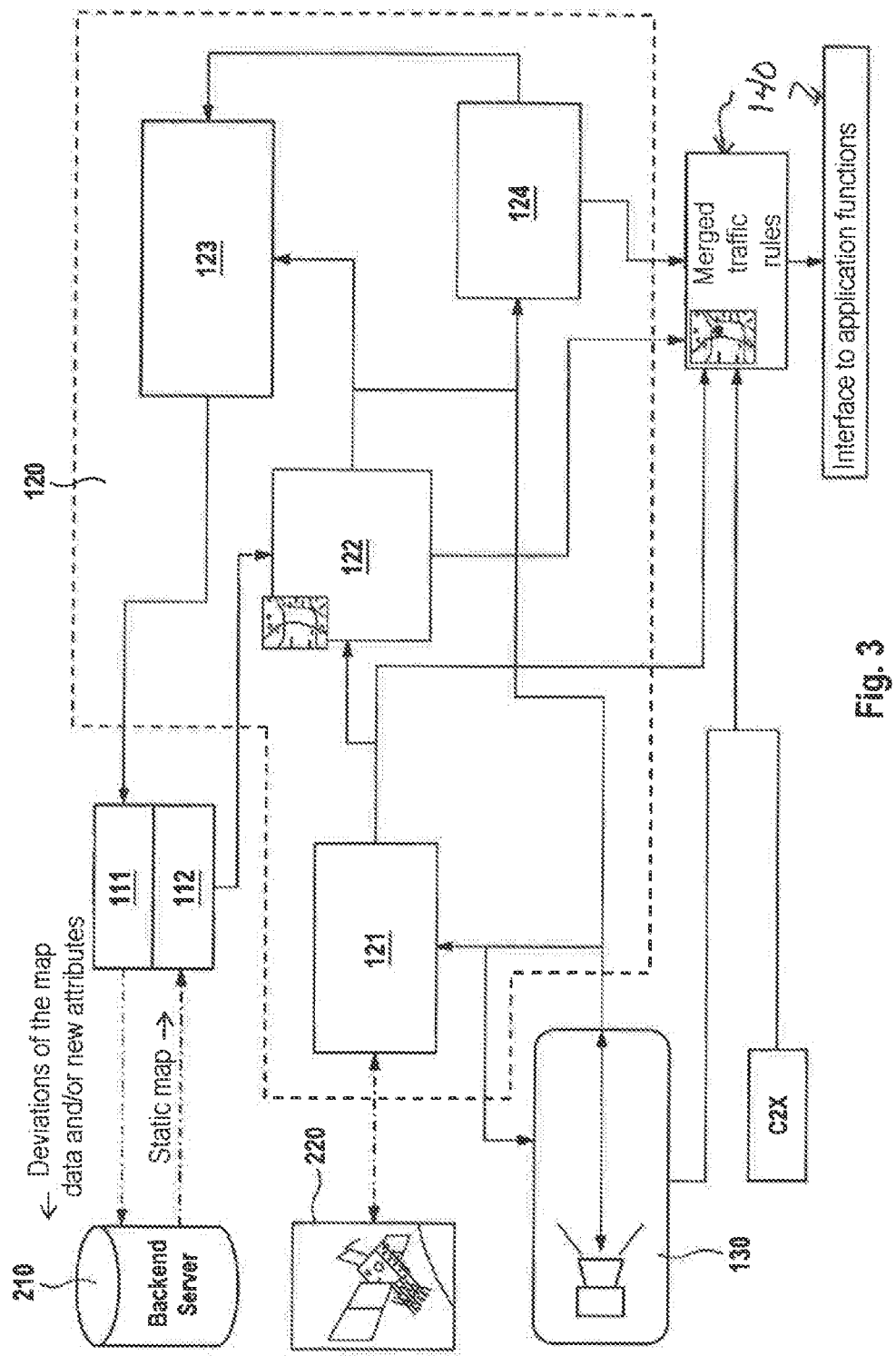
FIG. 3 shows an exemplary second design of a functional architecture of a system.

In FIGS. 2 and 3, an exemplary embodiment of a vehicle system is shown in two different levels of detail.

In FIG. 2 the vehicle system is shown at a system level. It shows the system 100, wherein the system boundary is shown in FIG. 2 by dashed lines. The system 100 is inter alia connected to a backend server 210, for example a map server, by means of which current data for the digital map can be obtained. Said backend server is connected to an internal server 110 of the vehicle that is a component of the system 100. Moreover, the system 100 is connected to at least one satellite 220.

The system 100 comprises inter alia a position and localization module 120 that is coupled to the internal server 110, the satellites 220 and a plurality of sensors 130. A detailed representation of the position and localization model 120 is shown in FIG. 3 and is described in more detail below. The position and localization module 120 is connected to a plurality of applications disposed in an application layer 140 and provides said applications with the corrected position 5 or 6.

A detailed representation of the position and localization module 120 is shown in FIG. 3. It comprises a localization unit 121 that comprises a GNSS unit and a sensor fusion unit and the first position 1 of the vehicle can be determined thereby. Said localization unit 121 is coupled to at least one GNSS satellite and a plurality of sensors 130.

Moreover, the position and localization module 120 comprises a unit 122 for fitting the first position into a digital map. A further unit 123 is used for the detection and plausibility checking of objects. A third unit 124 is used for orientation of the digital map and fitting the corrected position into a plausible lane.

The vehicle system 100 enables inter alia data relating to the object to be received by means of messages via vehicle-2-X, such as by means of the connection 125 shown between the V2X or C2X module and the sensors.

Further, the system enables a corrected position of an object or corrected data relating to the digital map to be transmitted to a map server. This is carried out by means of the internal server 110, which comprises an upload and download unit 111, 112 for this. In this way it is possible to obtain the digital map from a map server and to check the same by means of a time stamp of the digital map and to reject it if another digital map is more up to date.

Further advantageous alternate embodiments include a method for improved position determination, wherein a first position is determined by means of a global satellite navigation system and wherein the first position is fitted into a digital map, wherein a second position is determined relative to an object that is recorded in the digital map, characterized in that, the first position is corrected by means of the second position.

Alternately another method further including the correction of the first position by means of the second position is carried out during an iterative adjustment, in particular during a so-called least squares method. Alternately another method further including the second position is determined by means of an environment sensor system.

Alternately another method further including the environment sensor system comprises a camera sensor system and/or a radar sensor system and/or a lidar sensor system and/or an ultrasonic sensor system and/or a temperature sensor system and/or a rain sensor system and/or a road condition sensor system.

Alternately another method further including a third position is determined by means of an inertial sensor system in the context of dead reckoning.

Alternately another method further including the inertial sensor system detects a three-dimensional rate of turn and a three-dimensional acceleration.

Alternately another method further including the first position is additionally or alternatively corrected by means of the third position.

Alternately another method further including a fourth position is determined by means of a steering angle sensor system and a wheel revolution rate sensor system.

Alternately another method further including the first position is additionally or alternatively corrected by means of the fourth position.

Alternately another method further including the global satellite navigation system is a GPS system, a Glonass-system or a Galileo system.

Further advantageous alternate embodiments include a system for improved position determination, comprising a global satellite navigation system, an environment sensor system, a steering angle sensor system, a wheel revolution rate sensor system and an inertial sensor system, characterized in that the system is designed to carry out a method as described above.

A use of the system in a vehicle, in particular in a motor vehicle.

According to one embodiment it is therefore preferably provided that initially, as in the prior art, the GNSS vehicle position is mapped in the digital map.

However, the map particularly preferably contains additional fixed location objects, so-called "landmarks".

All data in the map are preferably referenced to a global reference coordinate system, for example the WGS (World Geodetic system 1984) data format.

The GNSS vehicle position is now preferably placed in the map coincident with the most plausible position and the relative distance from the referenced landmarks calculated in the closest proximity ($\Delta X_1 L_i$)

Fixed objects are detected from the vehicle, preferably by means of calibrated environment sensors (for example a camera, radar, lidar etc.), and the relative distance thereof from the vehicle is measured ($\Delta X_2 L_i$). Said distances are relatively accurate.

The position error of the map compared to reality is now $\Delta L_i = \Delta X_1 L_i - \Delta X_2 L_i$. In order to achieve the best positioning of the map in reality and to determine the true lane position from the maps, the map with the vehicle position is now preferably shifted and rotated until the smallest value for $\Delta L_i$ is achieved. This can particularly preferably be calculated with the so-called "least square fit" method MIN($\Delta L_i^2$). Finally, the vehicle position is now brought into coincidence with the origin of the environment sensor.

The real measurement by means of the environment sensors generally enables cm-accurate positioning to fixed objects in the surroundings of the vehicle. Lane-accurate assignment can be carried out by means of fitting into a georeferenced map with the same landmark information.

The residual error $\Delta L_{i\text{-}min} = (\Delta X_1 L_i)^* - (\Delta X_2 L_i)$ (* after fitting the map landmarks into the landmarks from the environment sensor system) is then preferably updated in the map and the map material is thereby optimized.

Likewise, landmarks that are not yet noted in the map can preferably be entered into the map.

Advantageously, the maps are stored in a static server and transmitted to the auto by means of a suitable radio transmission.

Owing to the known GNSS position of the vehicle, preferably only the data that are relevant to a certain region are transmitted and thus the amount of data is limited.

A further advantage of server-based map management is the possibility of statistically analyzing the returned "residual discrepancies" by analyzing a plurality of responses. Outliers indicate a fault in the transmitting vehicle.

Lane-accurate positioning in a map is in particular required during autonomous travel, because for example traffic rules are often correlated with lanes or accurate trajectory planning has to be calculated for the relevant lane. Likewise, the relevance can be determined from information relating to the actual direction of travel received by means of Car2X.

The invention claimed is:

1. A method for correcting a position of a vehicle with a global satellite navigation system (GNSS) for determining the actual position, comprising:
   determining a first position of the vehicle with the GNSS;
   determining a second position of the vehicle by adjusting the first position into a road of a digital map;
   identifying at least one object in the surroundings of the vehicle, the position of which can be referenced in the digital map;
   determining a real distance between the vehicle and the respective object with a sensor of the vehicle;
   calculating a computed distance between the second position and the respective object; and
   wherein a corrected position of the vehicle is determined by minimizing the deviation of the computed distance from the real distance.

2. The method of claim 1, wherein the digital map is shifted iteratively so that the deviation of the calculated distance from the real distance is minimized.

3. The method of claim 2, wherein a displacement of the digital map comprises at least one translational and one rotational displacement.

4. The method of claim 1, wherein the minimization of the deviation is determined according to the method of least squares.

5. The method of claim 1, wherein a plurality of objects, in particular two to three, are detected.

6. The method of claim 1, further comprising performing a second correction on the corrected position by fitting the corrected position into a plausible lane of the road.

7. The method as claimed of claim 1, further comprising:
   determining the shortest distance from the first position to a point on the road, in particular a plausible lane of the road, in the digital map; and
   fitting the first position in at said point to determine the second position.

8. The method as of claim 1, wherein the determination of the real distance is carried out by at least one of an environment sensor system, a camera sensor system, a radar sensor system, a lidar sensor system, an ultrasonic sensor system, a temperature sensor system, a rain sensor system, a road condition sensor system, and a chassis sensor system.

9. The method as of claim 1, wherein the determination of the first position is further carried out by the plurality of vehicle sensors.

10. The method of claim 1, wherein the determination of the first position is further carried out by a sensor fusion unit for merging and plausibility checking the sensor data.

11. The method of claim 1, wherein the position of the object is transmitted by a vehicle-2-X message.

12. The method of claim 1, comprising determining a corrected position of the respective object and transmitting the corrected position of the respective object to a map server.

13. The method of claim 1, wherein the digital map is obtained from a map server.

14. The method of claim 1, further comprising checking a time stamp of the digital map, comparing the time stamp of the digital map with a second digital map having a second time stamp and discarding the digital map if the second digital map is has a more recent second time stamp.

15. A system for correcting a position of a vehicle with a global satellite navigation system (GNSS) for determining the actual position comprising:
- a first position of the vehicle determined with the GNSS;
- a digital map and a computing unit, wherein the computing unit determines a second position of the vehicle by adjusting the first position into a road in the digital map;
- a device for identifying at least one object in the surroundings of the vehicle, the position of which can be referenced in the digital map;
- at least one sensor for determining a real distance between the vehicle and the respective object;
- wherein the computing unit is further designed for the calculation of a computed distance between the second position and the respective object; and
- wherein a corrected position of the vehicle can be determined by minimizing the deviation of the computed distance from the real distance.

16. The system of claim 15, wherein the computing unit determines the second position by determining the shortest distance from the first position to a point on the road or a plausible lane of the road.

* * * * *